United States Patent Office 2,794,085
Patented May 28, 1957

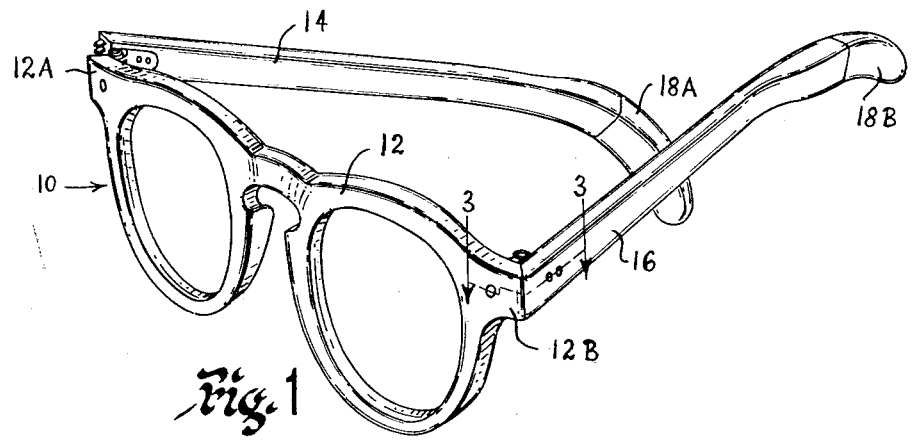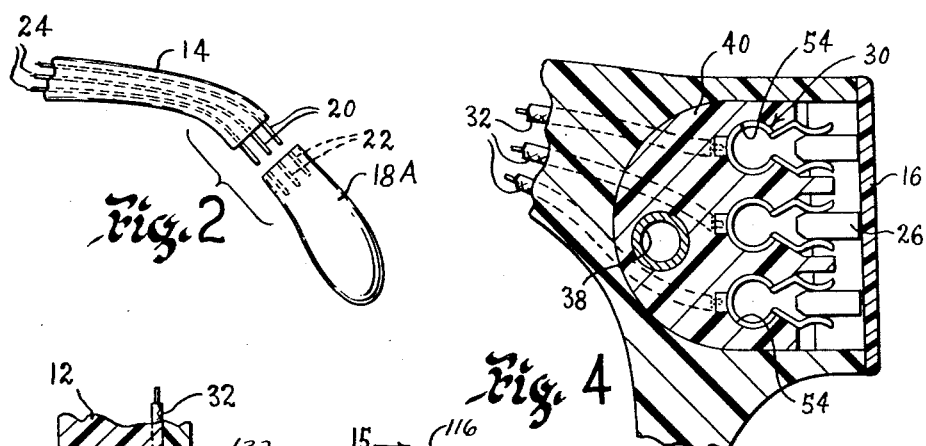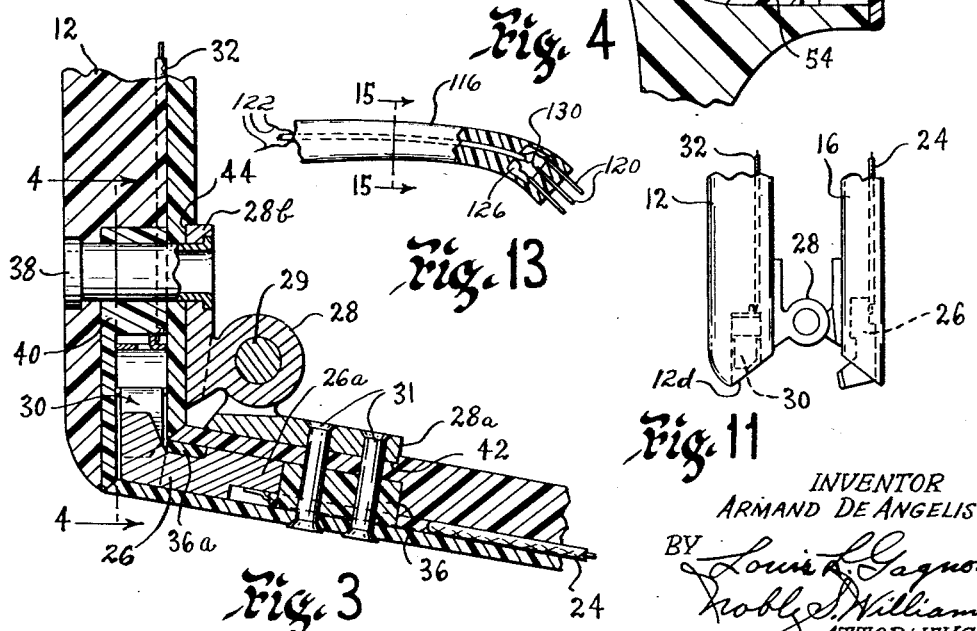

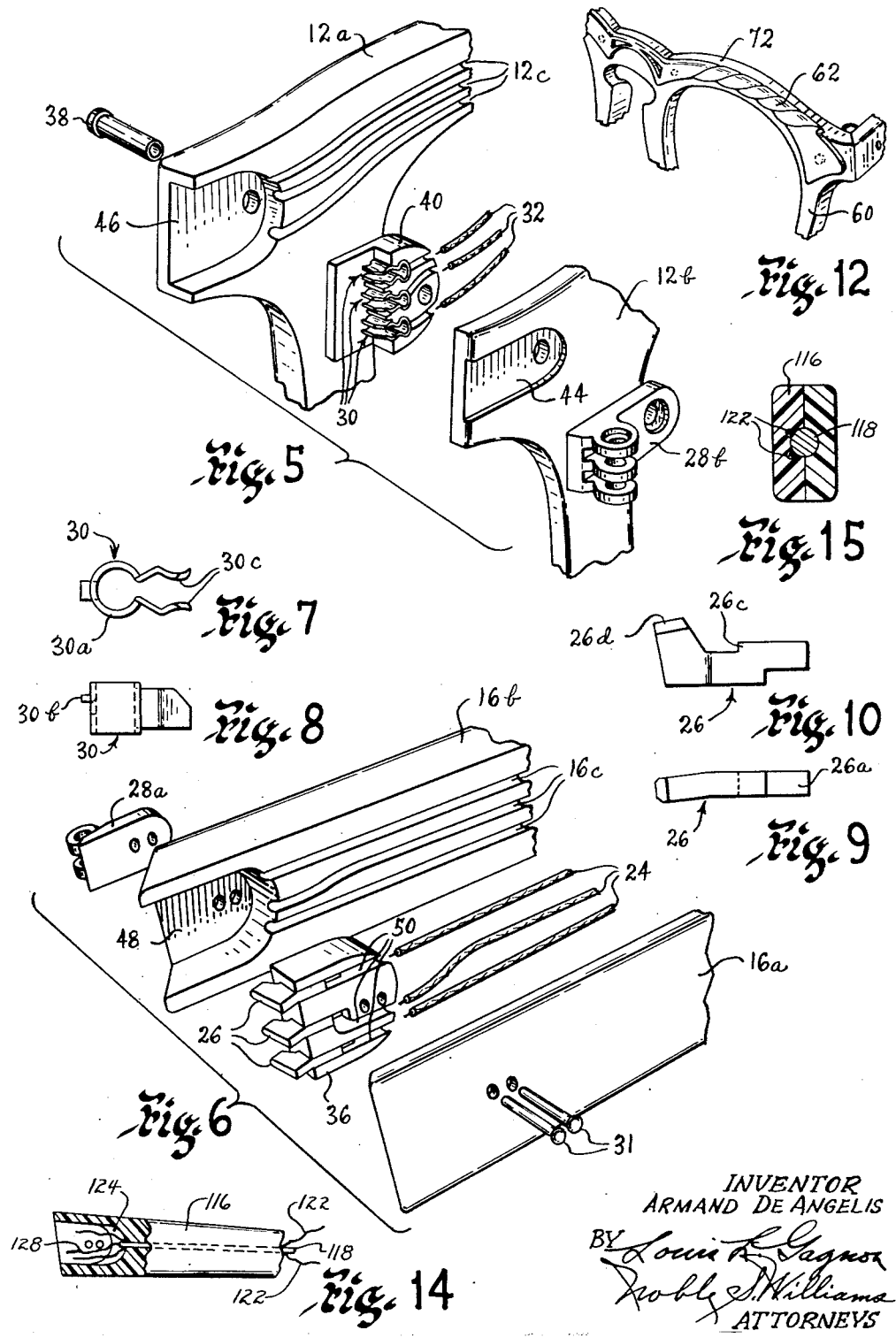

2,794,085

OPHTHALMIC MOUNTS

Armand De Angelis, Southbridge, Mass., assignor to American Optical Company, Southbridge, Mass., a voluntary association of Massachusetts Application August 4, 1955, Serial No. 526,399

11 Claims. (Cl. 200—61.58)

This invention relates to improvements in opthalmic mounts and the like, and more particularly to ophthalmic mounts provided with improved means for aiding the hearing of the persons wearing the mounts.

It has been proposed, heretofore, to provide upon the free ends of a pair of temples for spectacles, a pair of small inconspicuous end members or end pieces of special constructions within one of which may be contained compact light-weight hearing aid means and within the other of which may be contained small battery means for energizing the hearing aid means. In fact, it has been found, furthermore, convenient to arrange such hearing aid means and battery means upon the ends of the pair of temples, respectively, in such a manner that either may be readily detached from the associated temple when desired or necessary. In this way, it is possible to arrange the specially constructed pair of spectacles with hearing aid means on either temple as desired and to have the battery means associated therewith on the other. When the hearing aid means and the battery means are so positioned upon the ends of a pair of temples and the spectacles are in use, it is desirable to have suitable current conducting means associated with the spectacles in such a way that energy from the battery means at one side of the wearer's head may be conveniently supplied to the hearing aid means at the opposite side of the wearer's head. Of course, it is desirable to have such current conducting means be as inconspicuously arranged as possible and same, if incorporated into the ophthalmic mount, should, nevertheless, provide a sturdy, light-weight and inexpensive construction and should supply the energy as indicated without producing unwanted noises in the equipment.

It is, accordingly, an object of the present invention to provide for a pair of spectacles or the like, arranged to receive hearing aid means and battery means in devices carried upon the ends of the temples, improved sturdy, light-weight and compact current conducting means therewith, whereby transmission of electrical energy from means at one temple location to means at other temple location may be accomplished by inconspicuous means and in such a manner that no undesired electrical noise will be produced in the hearing aid means during use thereof.

It is a further object of the present invention to provide for spectacles of the character described, current conducting means of such a construction and arrangement as to allow the spectacles provided therewith to be folded in conventional fashion when not in use.

It is an additional object of the invention to provide with such a pair of foldable spectacles, suitable means incorporated therein in such a manner that the current through conducting means thereof will be allowed to flow only when the temples are "open" or in an extended position and ready for use, and of such a construction that the current in said conducting means will be automatically interrupted when the temples are pivoted to their folded positions.

It is also an object of the invention to provide in an ophthalmic mount of the character described and equipped with hearing aid means, battery means and current conducting means, a pivotal connection and electrical switch means operative positioned between each temple and the frame and which are of such construction and arrangement that a firm slidable electrical connection (or connections) will be established and maintained between yieldable separable contact members of said switch during a considerable portion of the pivotal movement of each temple as it approaches its fully open position.

It is a further object of the invention to provide in conjunction with such a pivotal connection and switch means a construction and arrangement of parts which will allow adjustment of the angle of inclination of each temple relative to the frame so as to comfortably fit the individual wearing the mount and which adjustment upwardly or downwardly a few degrees, as required, may be made without in any way weakening the pivotal connection or detrimentally affecting the firm electrical connection (or connections) formed by the separable contact members of said switch means.

It is also an object to provide in such an ophthalmic mount, constructed and arranged for adjustment of the inclination angle thereof, means whereby the amount of outward pivoting of the temples may be adjusted when necessary for the comfort of the wearer without in any way changing the switch means associated therewith.

It is additionally an object to provide in the temples of such ophthalmic mounts bendable core means of suitable metallic material for accepting and maintaining the shape and adjustment desired for the temple in which it is embedded in accordance with the wearers' facial requirements, said core means at the same time functioning as one of the electrical conductors for the hearing aid means to be used therewith.

It is a further object of the invention to provide in such an ophthalmic mount equipped with hearing aid means, battery means and interconnecting conducting means a construction and arrangement of parts which will be strong, durable and inexpensive to make and assemble and which, when the temples are extended, will establish one or more firm and noiseless disengageable electrical connections for said current conducting means thereof.

It is a further object to provide for such pairs of spectacle frames and associated temples arranged to accommodate hearing aid means and battery means thereon, a method of construction and arrangement by which the parts may be easily formed and easily assembled during the manufacture of the ophthalmic mount and which method will provide when the parts are in the finished product a sturdy and durable construction allowing the spectacles to be used over long periods of time without having undesired wear or electrical noises develop in the operative parts thereof.

It is also an object to provide a convenient, inexpensive and rapid method of forming spectacle frames and temples adapted to receive hearing aid means and battery means thereon and to have interconnecting conductors associated therewith in such a way as to be substantially unnoticeable when the spectacles are upon the face of the wearer, or at least not recognizable as such; and with such means being free from objectionable exposed projecting parts either when the temples are in an open or folded position against the frame.

Other objects and advantages of the invention will become apparent from the detailed description which follows when taken in conjunction with the accompanying drawing in which:

Fig. 1 is a perspective view of an ophthalmic mount having detachable hearing aid means and battery means thereon and embodying the present invention;

Fig. 2 is a side elevational view of a part of the structure of Fig. 1 and showing the hearing aid means (or battery means) detached from the temple thereof;

Fig. 3 is a fragmentary sectional view taken substantially upon line 3—3 of Fig. 1 and looking in the direction of the arrows;

Fig. 4 is an enlarged sectional view taken substantially upon section line 4—4 of Fig. 3 and looking in the direction of the arrows;

Figs. 5 and 6 are enlarged exploded views of the frame and temple portions, respectively, of the ophthalmic mount of Fig. 1 and showing associated parts of both in aligned relation to each other and ready for assembly;

Figs. 7 and 8 are top and side views, respectively, of an electrical part of the device;

Figs. 9 and 10 are bottom and side views, respectively, of a different electrical part of the device;

Fig. 11 is a fragmentary plan view of a part of the ophthalmic mount of Fig. 1 but showing parts thereof in folded relation to each other;

Fig. 12 is a fragmentary perspective view of an opthalmic mount and showing a slightly modified form of the invention;

Figs. 13 and 14 are fragmentary side elevational views showing different parts of a temple embodying a modified form of the invention, parts being broken away to better reveal details thereof; and Fig. 15 is an enlarged sectional view taken substantially upon section-line 15—15 of Fig. 13.

Referring to the drawings in detail and in particular to Fig. 1, there is indicated at 10 an ophthalmic mount which appears to be of substantially conventional design but which, in fact, embodies the present invention. This mount comprises a spectacle frame 12 formed of zyl, or equivalent plastic material, having hingedly supported upon its opposite outer ends a pair of temples 14 and 16 equipped at their free ends with a pair of similarly appearing devices 18A and 18B. These devices are, however, of different and special construction and are arranged to enclose hearing aid means and battery means, respectively. Since the specific constructions of the battery means and the hearing aid means form no part of the present invention, details thereof will not be described herein.

As is clearly apparent in Fig. 2, devices 18A and 18B may be readily attached to and readily detached from the free ends of both temples since each temple is provided with a plurality of rigid parallelly extending fixed prongs 20 adapted to fit into a corresponding number of sockets 22 in the detachable device and to have frictional engagement with electrical contact means (not shown) therein. Thus, when it is desired, it will be an easy matter to remove either device 18A or 18B from the associated temple, whether this be because of need of repair or replacement of a device, or in order to provide the hearing aid means upon the left or right temple of the ophthalmic mount as desired; same depending, of course, upon the requirements of the individual wearing the spectacles.

Within each temple, 14 or 16, is contained or embedded a plurality of thin parallel electrical conductors 24 soldered or otherwise connected to the embedded ends of the fixed prongs 20, and these conductors in turn have their opposite ends soldered or otherwise connected to small tabs 26a on switch contact blades 26 (see Figs. 3 and 11) adjacent a hinge 28 pivotally connecting the temple 14 or 16, as the case may be, to a temporal end portion 12A or 12B, of the opthalmic mount 12. Within an end of the frame 12 and adjacent the hinge 28 are similarly positioned resilient electrical contacts means 30 for engagement by contact blades 26, respectively, and to each of these spring contact means 30 is, in turn, connected to an end of one of a plurality of electrical conductors 32.

Conductors 32 extend in generally parallel relation to each other across the frame 12 from one temporal end portion to the other and may, in one form of construction be embedded within the frame 12. (A similar hinge and electrical construction is used at the opposite end of the ophthalmic mount and so only one end need be described in detail herein.)

In ophthalmic mounts embodying the present invention and intended for use with hearing aid means and battery means of the type carried by the temples, not only must care be exercised to provide between the frame and each temple a pivotal construction which will be strong and durable, but also it is desirable to provide electrical connecting means adjacent this location for the additional purpose of securely connecting the electrical conductors of the temples to the electrical conductors of the frame. It has been found that such electrical connecting means may be arranged to additionally serve as switch means for interrupting all flow of electrical current through these conductors while the temples are in a folded position against the frame and thus while the ophthalmic mount is not being used. Of course, all such interruptable electrical connections in electric circuits supplying current for hearing aid purposes should be, while in use, positive and free from electrical noises, etc.; even after repeated pivoting of the temples has taken place and the electrical connections associated therewith have been opened and closed many times.

To this end, there is provided for the hinge means 28 mentioned above, a pair of rivets or the like 31 (see Figs. 3 and 6) which extend through the temples 16, through a pre-formed switch block 36 embedded in the temple and through a leaf 28a of the hinge 28. The other leaf 28b of the hinge 28 is, in turn, secured by means of a larger hollow rivet or the like 38 to the frame 12 and this hollow rivet, in a similar manner, extends through the frame 12, through a second pre-formed switch block 40 embedded within a temporal end portion of the frame and through the leaf 28b. In order to more positively secure both leaves of the hinge 28 in place, leaf 28a is arranged to seat in a shallow recess 42 (see Fig. 3) of corresponding shape formed in the inner face of the temple 16 and the leaf 28b is seated in a similar recess 44 (see Fig. 5) in the inner face of the frame 12.

In order to make the device of the present invention in a rapid and economical manner, the following method steps are employed. The temples 14 and 16 and the frame 12 are each initially formed in two parts as indicated by numerals 16a; 16b and 12a, 12b, respectively, in Figs. 5 and 6; and in the interior face of parts 12a and 16b are formed a plurality of elongated recesses 12c and 16c to accommodate the generally parallel conductors 32 and 24 respectively.

Also formed in each temporal end portion of the frame part 12a is a recess 46 for accommodating the switch block 40 adjacent an end of the frame 12, so that electrical contact parts carried by this block will be at times exposed for purposes which will be more fully explained hereinafter. In like manner, there is provided within the temple part 16b a recess 48 for accommodating the switch block 36.

It has been found preferable to form each of the switch blocks 36 and 40 initially by an injection molding technique. The block 36, for example, will be thus formed to shape and provided with a pair of openings for receiving the rivets 31. Additionally, a plurality of narrow recesses 50 will be formed therein for receiving the plurality of switch contact blades 26 mentioned previously in fixed position therein. These blades, of course, will be fitted in their recesses only after electrical conductors 24 have been soldered onto the end portions 26a thereof. One of these blades 26 is shown in detail in Figs. 9 and 10. Not only do the recesses 50 snugly receive these blades but each blade is provided with a shoulder portion 26c for engaging a part 36a (see Fig. 3) of the block for preventing the blade from pulling out of its recess during use of the device.

Thus, after the conductors 24 have been secured to blades 26 and these parts inserted in recesses 50, the block 36 and conductors will be inserted into recesses 48 and 16c, respectively. Thereafter, the temple part 16a may be secured by cementing or by heat and pressure, or both, to the temple part 16b. It will then only be necessary to rivet the hinge part 28a to the temple to complete the unit.

In a similar manner, the switch block 40 may be injection molded to the desired size and shape, provided with an opening for receiving the rivet 38 and provided with a plurality of recesses 54 (see also Fig. 4) for closely receiving the partly circular base portions 30a of the spring contacts 30 mentioned previously. One of these spring contacts 30 (which are preferably formed of beryllium copper) is shown in detail in Figs. 7 and 8. A tab 30b may be struck out of the contact member 30 as same is being formed to shape and to this tab, one of the conductors 32 will be secured as by soldering.

The spring contacts 30 and conductors 32 are then inserted into recesses 54 with the flared spring fingers 30c thereof extending outwardly so as to be exposed (see Fig. 5) and thereafter the block 40 and conductors 32 will be inserted into recesses 46 and 12c, respectively, in frame 12. The frame parts 12a and 12b may then be permanently secured together and the hollow rivet inserted and flared to secure the hinge leaf 28b in place in recess 44 to complete the unit.

After these assembly steps have been completed, it is only necessary to interfit the barrels of the hinge parts 28a and 28b together and insert and secure a pintle 29 in place in known manner to complete the ophthalmic mount 10. The mount will then be ready to receive the usual eye lenses and the detachable end pieces 18A and 18B. The switch parts adjacent each hinge will thus be completely enclosed within the mount when the mount is open and before the face of the wearer. However, when the mount is removed and the temples are folded so as to lie next to the frame 12 only the outer ends of the contact blade 26 will be exposed and these only slightly.

To ensure easy engagement of the blades 26 between the pairs of spring contact fingers 30c (see Fig. 4) the leading edges of the blades are beveled as indicated at 26d and the individual resilient fingers of each pair of contact fingers are flared outwardly as indicated and may be slightly beveled at their adjacent outermost portions, if desired.

While conductors 24 and 32 have been shown as being insulation covered, it will be readily appreciated that such coverings are not necessary in cases where the temples and frames are to be formed of material of a good insulating quality, such as certain plastics or zyl. If these parts are, however, formed of metal, the covering material will be essential. Blocks 36 and 40 in all cases, nevertheless, will be made of insulating material.

In Fig. 12, a slightly modified ophthalmic mount 60 is disclosed, this mount differing somewhat from the modification previously discussed in that a metallic trim-piece 62 is mounted upon a plastic frame 72, as by rivet means or the like, which, of course, will be electrically connected to one of the spring contacts 30, preferably the center one, at each end of the frame, and thus the trim-piece may take the place of one of the conductors 32 in the earlier described modification.

While relatively stiff contact blades 26 extend only slightly beyond the zyl material of the temple 16, as is clearly indicated in Fig. 11, and they are not objectionable either from the standpoint of catching onto clothing or the like or from the standpoint of being so exposed as to become injured while the temples are folded. They, nevertheless, extend sufficiently to enter between and have considerable sliding engagement with the spring contact fingers 30c enclosed within the frame 12 appreciably before the associated temple has been pivoted to its fully open position. In fact, the electrical contacting surfaces of parts 26 and 30 at this time is quite material and the spring contact pressure quite positive and for all practical purposes unchanged for at least the last five to ten degrees or more of pivoting of the temple to its fully open position; and this is even though these spring fingers 30c are completely enclosed and protected by the frame 12.

An advantage to be gained by this arrangement is that of having the abutment surface 12d which is to be engaged by the end of the temple exposed when the temple is folded and thus this surface 12d may be, during fitting of the mount to the wearer, ground down slightly, if desired, thereby allowing the temple to swing to a little wider open position. Only a very slight amount of material would be removed during such an operation for surface 12d is very close to the pintle 29.

Another adjustment which may be readily made when such a hinge construction and switch means are employed is that to care for the proper angle of inclination of each temple relative to the plane of the frame 12. Usually approximately a 10° downward slant of each temple extending outwardly from the frame is desirable. However, this amount may be varied slightly at times by the optician fitting the mount to the individual wearer and this could be accomplished, in known fashion, such as by holding the frame in one hand and with proper tool gripping the top and bottom of the hinge connection while bending the parts slightly upwardly or downwardly. This adjustment, it should be noted, will not in any way be injurious to the associated switch parts establishing the firm electrical contacts mentioned above between parts 26 and 30. This is probable because of the appreciable amount of free sliding area which is provided between these contact members without effecting an appreciable change in the conductivity through the parts.

In Figs. 13 and 14 are shown opposite end portions, respectively, of a temple 116 embodying a somewhat different form of the invention. Parts have been broken away in these figures and other parts omitted in order to better show this modified form of the invention. In these figures, instead of using a plurality of similar generally parallel light-weight conductors as in the modification of Fig. 2, the temple 116 is provided with a relatively large bendable metallic core member 118, much like that often used in ophthalmic zyl temple constructions, for allowing and enabling the temple to be bent to better fit the facial contours and requirements of the wearer of the mount and which core is of such characteristics as to be capable of maintaining the temple in the form desired.

The core 118 in the improved construction also serves as one of the electrical conductors for the hearing aid means. Adjacent and, if desired, twisted about this core are provided a plurality of very fine plastic-covered wires 122 which are likewise intended to serve as electrical conductors. Fig. 15 shows, on an enlarged scale, a cross section of temples 116 with core 118 and fine conductors 122 encased therein. A pair of recesses 124 and 126 are provided within the opposite ends of this temple. The opposite ends of core member 118 extend into these recesses as do also the slack free ends of fine conductors 122. These outer free ends are soldered to fixed prongs 120 carried by the temple 116 and the inner ends are arranged to be secured to contact blade 26 in switch block 36. Similarly, fine wires 128 and 130 will be employed to connect the ends of the core member 118 to one of the blades 26 and to one of the prongs 120, respectively. The core 118 and fine wires 122, in this modification, have been purposely placed close to the center of the temple and the reason for this is so that same will be subjected to as little stretching as possible while the temple is being heated and bent to the individual shape desired. The method of assembly of this modified temple will be substantially the same as that previously described for temples 14 and 16.

Having described my invention, I claim:

1. An ophthalmic device of the character described comprising an ophthalmic mount having means thereon for supporting a pair of lenses before the eyes of a wearer of the device, a portion of said mount adjacent each temporal end thereof having a hinge element secured thereon, a pair of temples at opposite ends of said mount and each having a companion hinge element thereon, means for pivotally connecting the hinge elements on said mount to the hinge elements on said temples for effecting a hinge connection between each temple and said mount, to thereby allow said temples to be pivoted from an open position for use to a folded position when not in use, electrically conductive means carried by said mount and extending from a location adjacent one hinge element thereon to a location adjacent the other hinge element thereon at the opposite end of said mount, electrically conductive means carried by each temple and extending from an outer free end portion thereof to a location adjacent the hinge element thereon, and contact means on said mount and on said temples, respectively, adjacent said hinge elements for establishing an electrical connection between the electrically conductive means carried by said mount and the electrically conductive means carried by said temples when said temples are hinged to an open position for use by the wearer of the device, each pair of said contact means at opposite ends of said mount, during pivoting of the temple associated therewith toward open position, establishing a continuous pressure slidable engagement therebetween appreciably before said associated temple reaches its fully open position and maintaining said engagement while said temple continues to pivot to its fully open position.

2. An ophthalmic device of the character described comprising an ophthalmic mount having means thereon for supporting a pair of lenses before the eyes of a wearer of the device, a portion of said mount adjacent each temporal end thereof having a hinge element secured thereon, a pair of temples at opposite ends of said mount and each having a companion hinge element thereon, means for pivotally connecting the hinge elements on said mount to the hinge elements on said temples for effecting a hinge connection between each temple and said mount, to thereby allow said temples to be pivoted from an open position for use to a folded position when not in use, a plurality of electrically conductive means carried by said mount in spaced relation to each other and extending from a location adjacent one hingle element thereon to a location adjacent the other element thereon at the opposite end of said mount, a plurality of electrically conductive means carried by each temple in spaced relation to each other and extending from an outer free end portion thereof to a location adjacent the hinge element thereon, and a plurality of contact means on said mount and on said temples, respectively, adjacent said hinge elements for establishing an electrical connection between each electrically conductive means carried by said mount and each electrically conductive means carried by said temples when said temples are hinged to an open position for use by the wearer of the device, each pair of said contact means at opposite ends of said mount, during pivoting of the temple associated therewith toward open position, establishing a continuous pressure slidable engagement therebetween appreciably before said associated temple reaches its fully open position and maintaining said engagement while said temple continues to pivot to its fully open position.

3. An ophthalmic device of the character described comprising an ophthalmic mount having means thereon for supporting a pair of lenses before the eyes of a wearer of the device, a portion of said mount adjacent each temporal end thereof having a hinge element secured thereon, a pair of temples at opposite ends of said mount and each having a companion hinge element thereon, means for pivotally connecting the hinge elements on said mount to the hinge elements on said temples for effecting a hinge connection between each temple and said mount, to thereby allow said temples to be pivoted from an open position for use to a folded position when not in use, a plurality of electrically conductive means carried by said mount in spaced relation to each other and extending from a location adjacent one hinge element thereon to a location adjacent the other element thereon at the opposite end of said mount, a plurality of electrically conductive means carried by each temple in spaced relation to each other and extending from an outer free end portion thereof to a location adjacent the hinge element thereon, at least one of said electrically conductive means carried by said mount and by said temples being embedded within the material forming the mount and temples, respectively, and a plurality of contact means on said mount and on said temples, respectively, adjacent said hinge elements for establishing an electrical connection between each electrically conductive means carried by said mount and each electrically conductive means carried by said temples when said temples are hinged to an open position for use by the wearer of the device, each pair of said contact means at opposite ends of said mount, during pivoting of the temple associated therewith toward open position, establishing a continuous pressure slidable engagement therebetween appreciably before said associated temple reaches its fully open position and maintaining said engagement while said temple continues to pivot to its fully open position.

4. A device as defined in claim 2 and in which at least one of the said electrically conductive means of said mount is disposed exteriorly thereof.

5. A device as defined in claim 3 and in which at least one of the said electrically conductive means of said mount is disposed exteriorly thereof.

6. A device as defined in claim 1 and in which said contact means on said mount and on said temple comprise a pair of spaced yieldable contact fingers and a contact blade engageable therewith, and movable one relative to the other, so that said contact blade will enter between and have firm sliding contact therewith as the associated temple is pivoted to its open position.

7. An ophthalmic device of the character described comprising an ophthalmic mount having means thereon for supporting a pair of lenses before the eyes of a wearer of the device, a portion of said mount adjacent each temporal end thereof having a hinge element secured thereon, a pair of temples at opposite ends of said mount and each having a companion hinge element thereon, means for pivotally connecting the hinge elements on said mount to the hinge elements on said temples for effecting a hinge connection between each temple and said mount, to thereby allow said temples to be pivoted from an open position for use to a folded position when not in use, a plurality of electrically conductive means carried by said mount in spaced relation to each other and extending from a location adjacent one hinge element thereon to a location adjacent the other hinge element thereon at the opposite end of said mount, a plurality of electrically conductive means carried by each temple in spaced relation to each other and extending from an outer free end portion thereof to a location adjacent the hinge element thereon, a recess in each temporal end portion, a recess in an end portion of each temple adjacent thereto, and a switch block in each recess carrying a plurality of spaced electrical contact means, said contact means being connected to said conductive means, respectively, for establishing an electrical connection between each electrically conductive means carried by said mount and each electrically conductive means carried by said temples when said temples are hinged to an open position for use by the wearer of the device, the contact means carried by one of said switch blocks being disposed entirely within its recess, the contact means carried by the other switch block and engageable therewith being disposed so as to extend a short distance outwardly of its recess, the ends of said mount and temple adjacent said recesses constituting abutment surfaces for limiting the extent of outward pivoting movement afforded the temple, whereby when the associated temple is folded the abutment surface adjacent the contact means which is entirely disposed within its recess will be exposed for adjustment purposes.

8. A device as defined in claim 1 and in which said electrically conductive means carried by each temple comprises a relatively stiff elongated bendable member centrally disposed in and extending the greater part of the length of said temple so as to function as a shape-retaining core therefor.

9. A device as defined in claim 2 and in which one of said electrically conductive means carried by each temple comprises a relatively stiff elongated bendable member centrally disposed in and extending the greater part of the length of said temple so as to function as a shape-retaining core therefor.

10. An ophthalmic device of the character described comprising an ophthalmic mount having means thereon for supporting a pair of lenses before the eyes of a wearer of the device, a portion of said mount adjacent each temporal end thereof having a hinge element secured thereon, a pair of temples at opposite ends of said mount and each having a companion hinge element thereon, means for pivotally connecting the hinge elements on said mount to the hinge elements on said temples for effecting a hinge connection between each temple and said mount, to thereby allow said temples to be pivoted from an open position for use to a folded position when not in use, a plurality of electrically conductive means carried by said mount in spaced relation to each other and extending from a location adjacent one hinge element thereon to a location adjacent the other hinge element thereon at the opposite end of said mount, a plurality of electrically conductive means carried by each temple, one of which comprises a relatively stiff elongated bendable member centrally disposed in said temple and extending from an outer free end portion thereof to a location adjacent the hinge element so as to function as a shape-retaining core for said temple, and another of which comprises a relatively thin wire disposed closely adjacent said bendable member but electrically insulated therefrom, and a plurality of contact means on said mount and on said temples, respectively, adjacent said hinge elements for establishing an electrical connection between each electrically conductive means carried by said mount and each electrically conductive means carried by said temples when said temples are hinged to an open position for use by the wearer of the device.

11. An ophthalmic device of the character described comprising an ophthalmic mount having means thereon for supporting a pair of lenses before the eyes of a wearer of the device, a portion of said mount adjacent each temporal end thereof having a hinge element secured thereon, a pair of temples at opposite ends of said mount and each having a companion hinge element thereon, means for pivotally connecting the hinge elements on said mount to the hinge elements on said temples for effecting a hinge connection between each temple and said mount, to thereby allow said temples to be pivoted from an open position for use to a folded position when not in use, a plurality of electrically conductive means carried by said mount in spaced relation to each other and extending from a location adjacent one hinge element thereon to a location adjacent the other hinge element thereon at the opposite end of said mount, a plurality of electrically conductive means carried by each temple, one of which comprises a relatively stiff elongated bendable member centrally disposed in said temple and extending from an outer free end portion thereof to a location adjacent the hinge element so as to function as a shape-retaining core for said temple, the others of which comprise relatively thin insulated wires disposed in entwined relation about said core, and a plurality of contact means on said mount and on said temples, respectively, adjacent said hinge elements for establishing a slidable electrical connection between each electrically conductive means carried by said mount and each electrically conductive means carried by said temples when said temples are hinged to an open position for use by the wearer of the device.

References Cited in the file of this patent

UNITED STATES PATENTS

| | | |
|---|---|---|
| 2,207,705 | Cox | July 16, 1940 |
| 2,613,282 | Scaife | Oct. 7, 1952 |

FOREIGN PATENTS

| | | |
|---|---|---|
| 1,096,930 | France | Feb. 9, 1955 |